(12) United States Patent
Shteynberg et al.

(10) Patent No.: US 6,635,862 B2
(45) Date of Patent: Oct. 21, 2003

(54) MIXED ARCHITECTURE LIGHT CURTAIN SYSTEM

(75) Inventors: Boris Shteynberg, San Francisco, CA (US); James A. Ashford, Portola Valley, CA (US)

(73) Assignee: Scientific Technologies Incorporated, Redwood City, CA (US)

( * ) Notice: Subject to any disclaimer, the term of this patent is extended or adjusted under 35 U.S.C. 154(b) by 34 days.

(21) Appl. No.: 09/912,169

(22) Filed: Jul. 24, 2001

(65) Prior Publication Data

US 2001/0040213 A1 Nov. 15, 2001

Related U.S. Application Data

(63) Continuation-in-part of application No. 09/866,242, filed on May 25, 2001, which is a continuation-in-part of application No. 09/523,406, filed on Mar. 10, 2000, now Pat. No. 6,297,498, and a continuation-in-part of application No. 09/626,098, filed on Jul. 26, 2000, now Pat. No. 6,294,777.

(51) Int. Cl.$^7$ ................................................ H01J 40/14
(52) U.S. Cl. ...................................... 250/221; 340/556
(58) Field of Search ....................... 250/221; 340/545.3, 340/555–557

(56) References Cited

U.S. PATENT DOCUMENTS 3,727,069 A * 4/1973 Crittenden et al. ...... 250/222.1
5,003,169 A * 3/1991 Sakaguchi et al. .......... 250/221
5,198,661 A     3/1993 Anderson et al.
5,281,809 A     1/1994 Anderson et al.
6,166,371 A    12/2000 Milbrath et al.

FOREIGN PATENT DOCUMENTS

| EP | 0369386 A | 5/1990 |
| EP | 0562726 A | 9/1993 |
| WO | WO 0054077 A | 9/2000 |

* cited by examiner

*Primary Examiner*—David Porta
*Assistant Examiner*—Stephen Yam
(74) *Attorney, Agent, or Firm*—Coats & Bennett, P.L.L.C.

(57) ABSTRACT

A mixed architecture light curtain system comprises a mix of flexibly and rigidly interconnected light curtain segments. For example, a number of light curtain segments may be rigidly interconnected in series at desired connection angles using one or more types of rigid connectors to form a set of rigidly connected segments. Another set of rigidly connected segments may be flexibly connected to this first set, or one or more individual segments may be flexibly connected in series with this first set. In general, a series of interconnected segments may be formed in any desired combination of rigidly and flexibly connected segments. In any such combination, differing types of rigid and flexible connectors may be used, such that rigidly and flexibly interconnected segments may be fixed at essentially any desired angle, offset, or relative spacing, allowing the mixed architecture light curtain to conform to complex and even disjointed protection zone shapes.

41 Claims, 11 Drawing Sheets

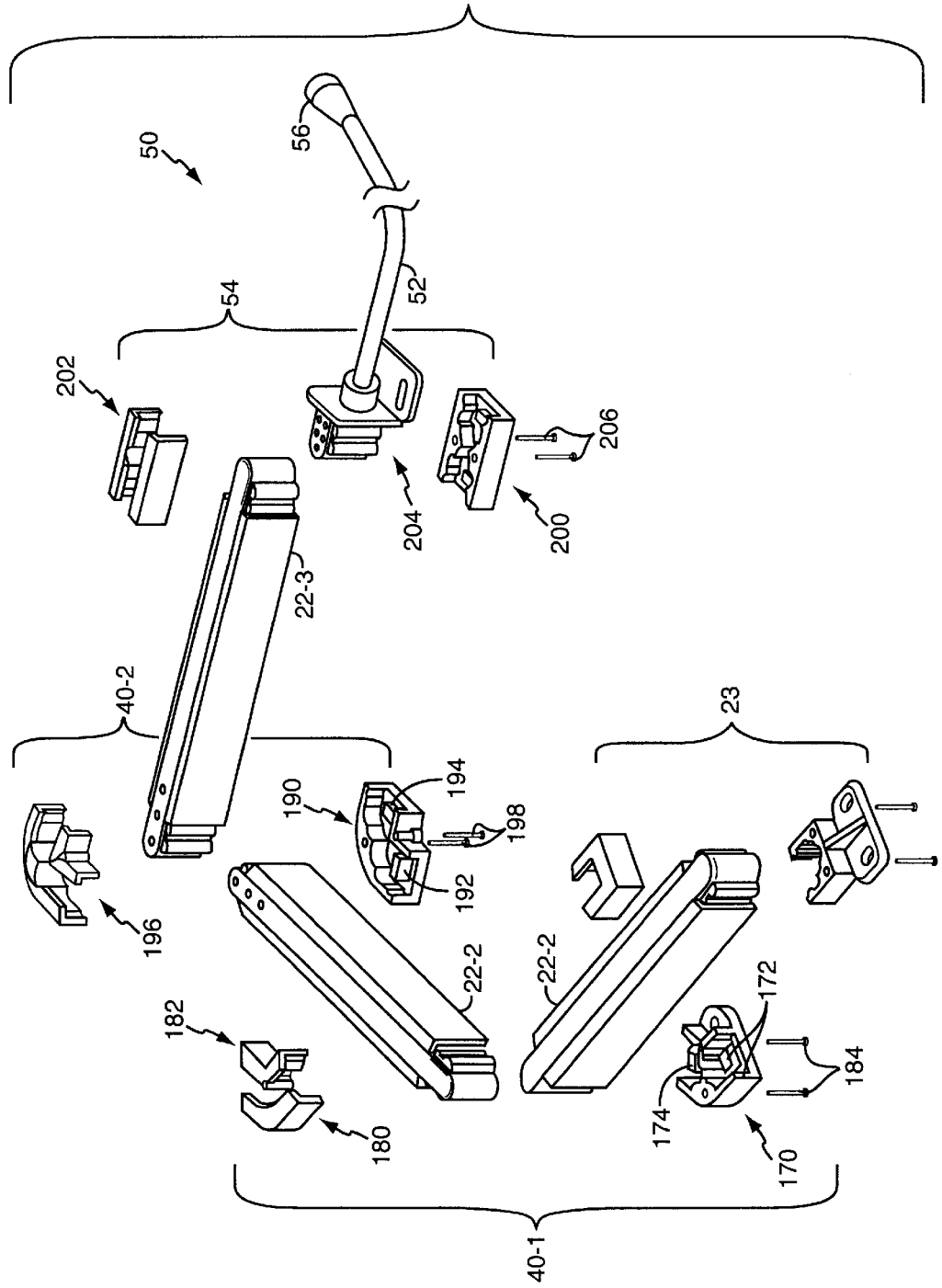

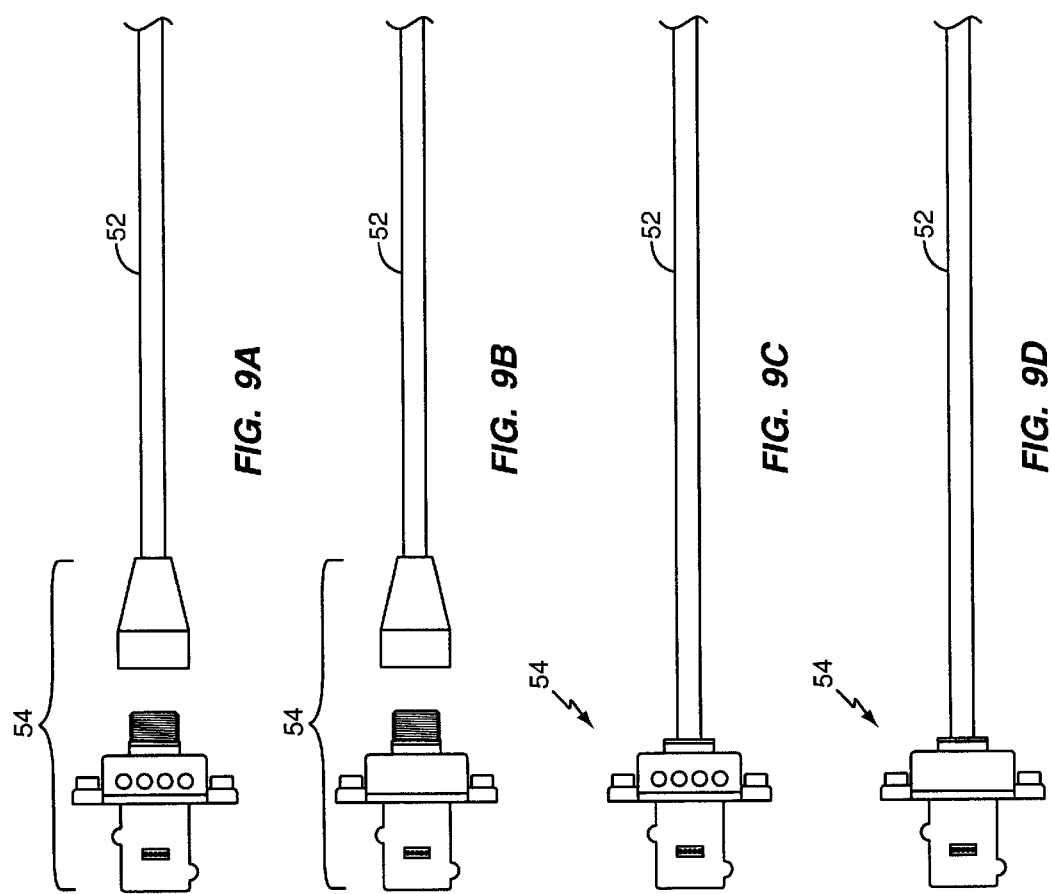

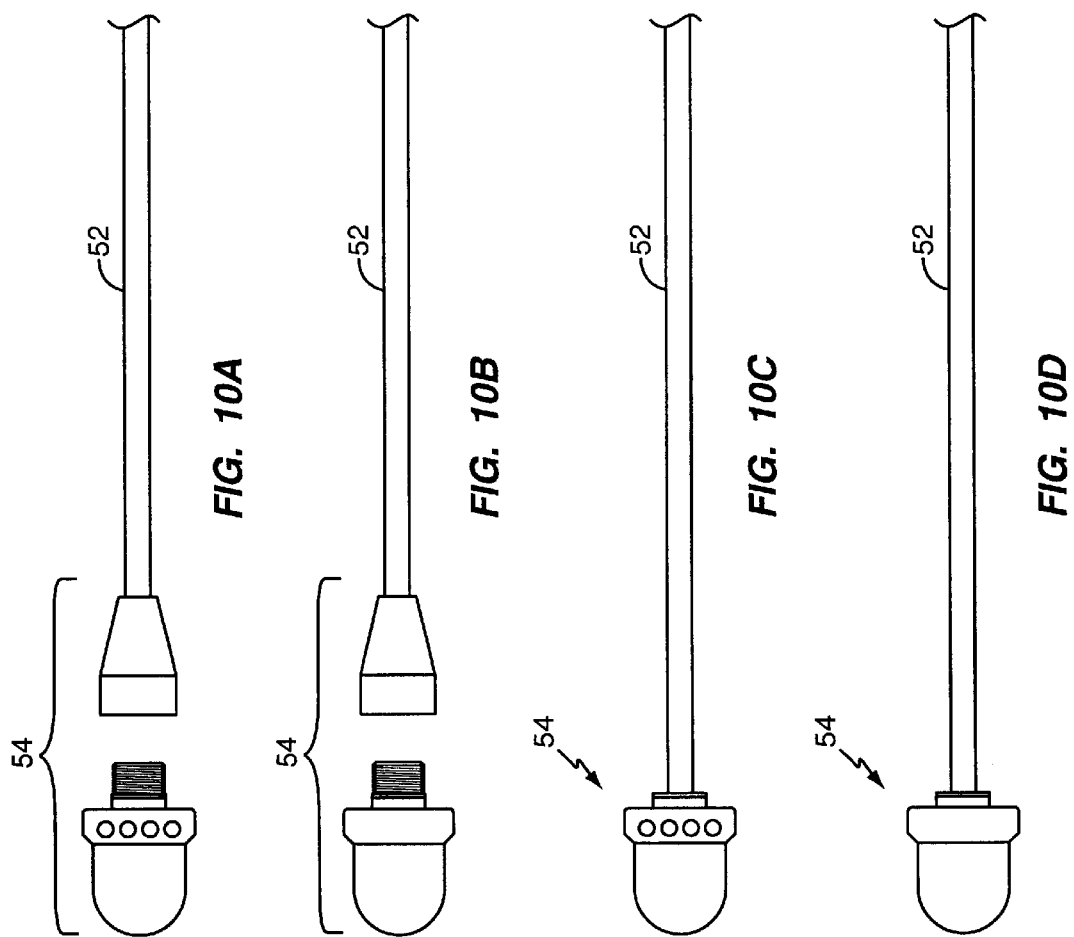

MIXED ARCHITECTURE LIGHT CURTAIN SYSTEM

RELATED APPLICATIONS

The present application is a continuation-in-part 09/866,242 of the application entitled "Segmented Light Curtain with Keyed Interfaces," filed on May 25, 2001, which is a continuation-in-part of application Ser. No. 09/523,406, filed on Mar. 10, 2000, now issued as U.S. Pat. No. 6,297,498 and entitled "Modular Articulated Light Curtain," and a continuation-in-part of application Ser. No. 09/626,098, filed on Jul. 26, 2000, also entitled "Modular Articulated Light Curtain", now issued as U.S. Pat. No. 6,294,777. The disclosures for all of these applications are incorporated herein by reference in their entireties.

BACKGROUND OF THE INVENTION

The present invention generally relates to light curtains, and particularly relates to light curtain systems comprising multiple segments.

Light curtain systems are typically used to detect the intrusion of human limbs or other objects into hazardous areas, such the loading area of a hazardous machine. However, the range of light curtain uses extends into areas well beyond machine guarding, such as in work piece scanning, toll gate monitoring, and in other presence sensing operations.

A light curtain segment contains one or more light units. In a transmitter segment, the light unit comprises a light-emitting device, such as a diode. In receiver segments, light units comprise light receivers, such as photosensitive transistors or diodes. Typically, a transmitter segment includes a number of transmitting light units and a corresponding receiver segment includes a corresponding number of receiving light units. The spacing of light units within a segment largely defines the detection resolution of the segment, which establishes the minimum object size detectable by the light curtain.

Processing logic activates the transmitter's light units, and monitors the receiver's light units to determine whether or not the receiver receives light beams transmitted from the transmitter. Failure to receive one or more light beams generally indicates an obstruction in the plane between the transmitter and receiver segment. In many applications, the area to be monitored by the light curtain has a complex shape, or may be discontinuous, comprising several detection zones with potentially different detection resolution requirements.

Conventional approaches to providing light curtain monitoring in oddly shaped or discontinuous areas include the use of multiple light curtain systems. However, this approach may not be desirable in terms of efficiency, and because of the complications involved with interfacing independent light curtains into a machine control loop. Segmented light curtains based on a number of rigidly interconnected segments provide additional flexibility, as do ones based on flexibly interconnected segments. However, neither of these segmented approaches offers the needed configuration flexibility in many applications.

BRIEF SUMMARY OF THE INVENTION

The present invention provides a method and systems to provide light curtain systems with enhanced configuration flexibility. A mixed architecture light curtain system comprises a mix of flexibly and rigidly interconnected light curtain segments. For example, a mixed architecture light curtain comprises a plurality of transmitter segments and a plurality of receiver segments, with each plurality comprising a mix of rigidly connected segments and flexibly interconnected segments that collectively form a group of interconnected segments. Thus, a mixed architecture light curtain preferably comprises a series of interconnected transmitter segments and corresponding series of interconnected receiver segments, where the inter-segment connections comprise a mix of rigid and flexible connectors.

With this approach, a portion of the light curtain may, for example, be based on rigidly interconnected segments, which allow the light curtain to conform to one or more perimeter angles, and may provide multiple planes of detection. This set of rigidly connected segments may then be connected through a flexible connector to an individual segment, which may itself be rigidly or flexibly connected to additional segments. Preferably, the rigid connectors and flexible connectors all provide for coupling of signals between the light curtain segments, such that the entire assemblage of interconnected segments, transmitter or receiver, functions as a series-connected set of segments.

"Rigid connector" used as a descriptive term herein encompasses a variety of connector configurations. The '406 and '098 patents incorporated herein by reference describe exemplary rigid connectors of various types, including both fixed-angle and rotatable-angle rigid connectors. These incorporated applications present exemplary embodiments of modular articulated light curtains, which comprise a series of light curtain segments interconnected by modular connectors that allow desired angular positioning of one segment relative to another, and permit the assembly of rigidly connected segments to conform to potentially complex detection perimeters. It should be understood that the present invention contemplates that one or more rigidly connected portions of a mixed architecture light curtain may comprise such modular articulated light curtains.

Rigid connectors may or may not include light units so as to continue detection capability across inter-segment junctures, and may or may not be configured to preserve beam spacing between joined segments. Nor is it necessary for a mixed architecture light curtain to maintain beam spacing across its collection of interconnected segments. Indeed, part of the mixed architecture's flexibility derives from the ability to interconnect segments or groups of segments with potentially different beam resolutions.

The co-pending application entitled "Segmented Light Curtain with Keyed Interfaces," also incorporated herein, illustrates the use of keyed rigid connectors to prevent misconnection between receiver and transmitter segments. Thus, rigid connectors as discussed herein may include keyed rigid connectors for differentiating between transmitter and receiver segments.

Keying may be extended to the flexible connectors, such that the flexible connectors configured for use with transmitter segments cannot be interfaced with receiver segments and vice versa. In general, the term "flexible connector" as used herein provides an elongate, flexible interconnection between light curtain segments, providing freedom to independently orient the joined segments, while still providing for interconnection of one or more light curtains signals between the segments.

Preferably, the flexible connections comprise some type of connecting cable that carries one or more signals between interconnected light curtain segments. Many varieties of flexible connectors are contemplated, including those formed integrally into segments on one or both cable ends, and those formed with detachable connectors at one or both cable ends. As with the rigid connectors, a single mixed-architecture light curtain may include more than one type of flexible connector.

Of course, the present invention presents the opportunity for much variation. The following detailed description highlights many of the advantages and features of mixed architecture light curtains, and sets forth exemplary configurations. Other advantages, features, and desirable configurations will be apparent upon reading the description and examining the accompanying drawings.

BRIEF DESCRIPTION OF THE DRAWINGS

FIG. 8 is a diagram of exemplary modular rigid connectors and exemplary modular flexible connectors for use in mixed architecture light curtains.

FIGS. 9A–9D are diagrams showing exemplary details for flexible connectors for use with the rigid connectors of FIGS. 4 and 5A–B.

FIGS. 10A–10D are diagrams showing exemplary details for flexible connectors for used with the rigid connectors of FIGS. 6 and 7A–7B.

DETAILED DESCRIPTION OF THE INVENTION

Figure 1:
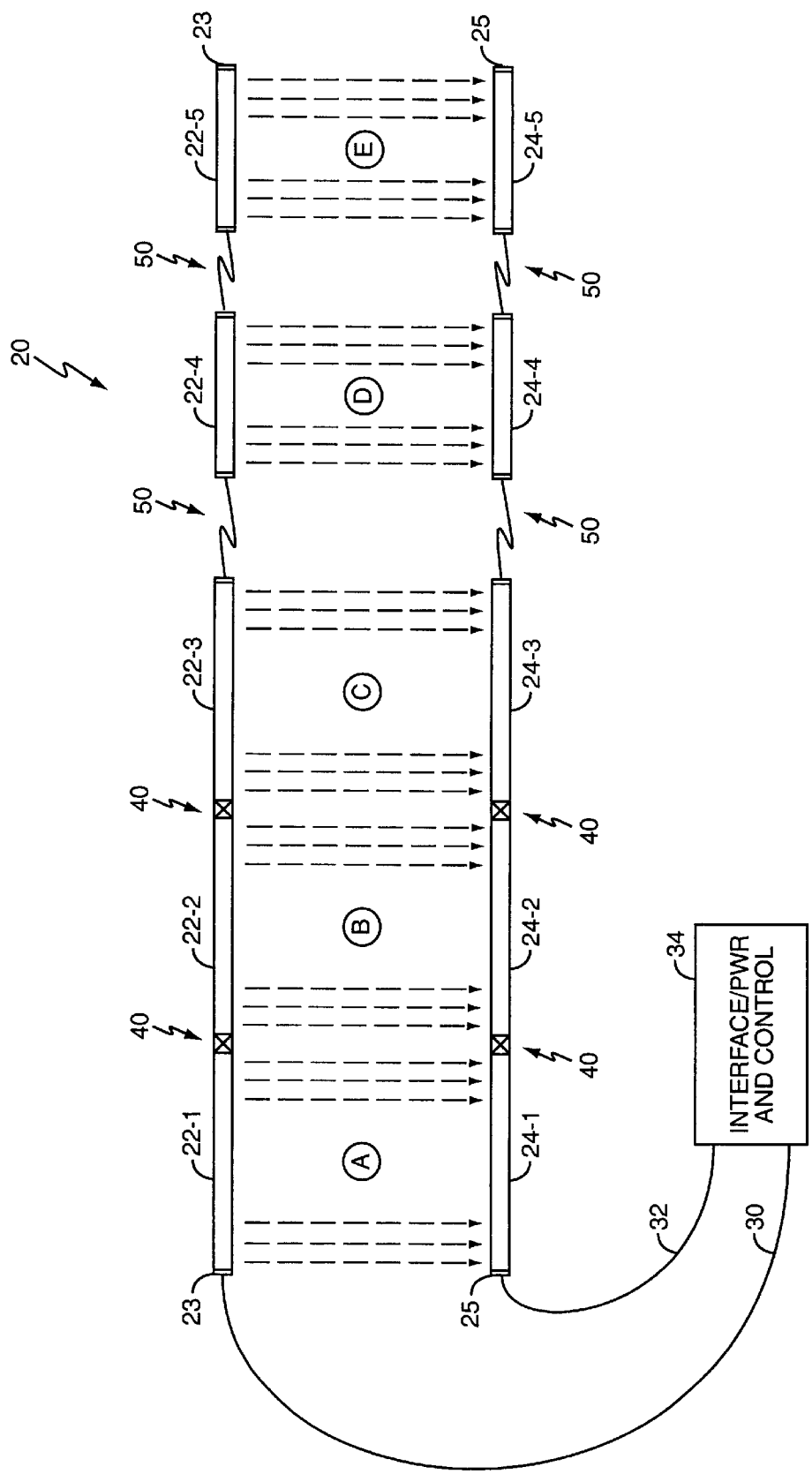
FIG. 1 is a general diagram of an exemplary mixed architecture light curtain.

FIG. 1 is a simplified illustration of a generalized mixed-architecture light curtain generally indicated by the numeral 20. The term "light curtain" as used herein generally refers to mixed-architecture implementations unless otherwise noted. The light curtain 20 preferably includes a plurality of series-connected transmitter segments 22 and a corresponding plurality of series-connected receiver segments 24. In the illustration, at least the first transmitter segment 22-1 includes an end cap 23, which interconnects it to the interface and control unit 34 through cable 30. Likewise, at least the first receiver segment 24-1 includes an end cap 25, which interconnects it to the interface and control unit 34 through cable 32.

In some implementations, the interface unit 34 includes processing systems operative to control and monitor the transmitter segments 22 and receiver segments 24, while in other cases the interface unit 34 simply includes the machine control interface devices. Such devices may include power control relays and other such equipment as may be needed to switch power into a guarded machine. Thus, processing logic for controlling and operating the light curtain 20 may be contained in the interface unit 34, or carried within one or more of the light curtains segments 22 and 24.

In the illustration, transmitter segment 22-1 corresponds to receiver segment 24-1, transmitter segment 22-2 corresponds to receiver segment 24-2, and so on. Each transmitter segment 22 and its corresponding receiver segment 24 are positioned in optical alignment with one another and form a detection plane comprising one or more light beams. In the illustration, the assembly of transmitter segments 22 aligns with the assembly of receiver segments 24 to provide five detection planes, labeled A through E.

In many practical applications, the required orientation and spacing of one detection plane with regard to another may be quite complex and not easily achievable with conventional light curtain configurations. The light curtain 20 accommodates complex detection plane configurations by providing a mix of rigidly connected segments and flexibly connected segments. In the exemplary illustration, the curtain 20 has three rigidly connected transmitter segments 22-1 through 22-3, and two flexibly connected transmitter segments 22-4 and 22-5. The receiver segments 24 are configured in a like manner to the transmitter segments 22. That is, the receiver segments 24 are interconnected in the same rigid and flexible segment combinations as the transmitter segments 22.

Rigid connectors 40 provide for rigid interconnection between the rigidly connected transmitter and receiver segments 22 and 24, respectively. Flexible connectors 50 flexibly interconnect transmitter segments 22-4 and 22-5, while flexible connectors 50 similarly interconnect receiver segments 22-4 and 22-5. In general, the light curtain 20 includes at least two rigidly interconnected segments flexibly interconnected to at least one additional segment. Of course the number of permutations achievable by interconnecting various combinations of rigid and flexible segments makes the light curtain 20 adaptable to practically any detection zone shape requirements, but also makes it impractical to enumerate all possible variations.

It should be further appreciated that a variety of connector types may be used for rigid connectors 40 and flexible connectors 50. Indeed, the system 20 may include a mix of different types of rigid connectors 40 and flexible connectors 50. In general, the light curtain 20 preferably comprises two or more rigidly connected transmitter segments 22 flexibly interconnected with one or more additional transmitter segments 22, along with like configured receiver segments 24.

However, the curtain 20 may comprise more complex combinations or groups of rigidly and flexibly joined segments, and may use various types of rigid and flexible connectors. Generically, these groups of light curtain segments 22 or 24 may be considered as jointed groups, flex groups, angled groups, and articulated groups, with the particular name ascribed to any one group determined by the connector type used to interconnect light curtain segments 22 or 24 within that group.

Figure 2:
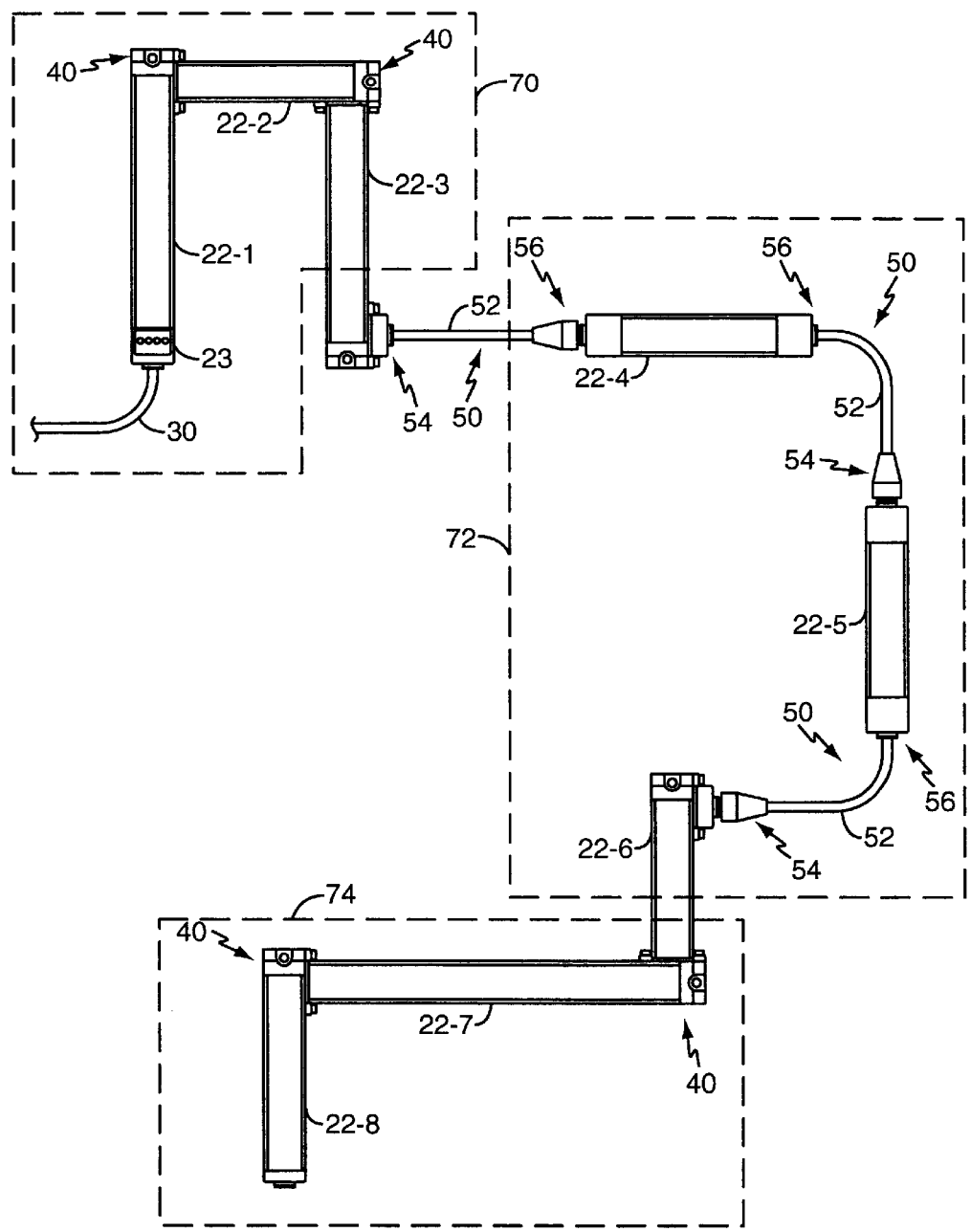
FIG. 2 is a diagram of one embodiment of the mixed architecture light curtain.

FIG. 2 illustrates an exemplary grouped arrangement for the light curtain 20. In the illustration, only the transmitter segments 22 are illustrated, but it should be understood that the curtain 20 also includes a corresponding set of receiver segments 24 configured in like manner to the transmitter segments 22. In the illustration, a jointed group 70 interconnects in series with a flex group 72, which in turn interconnects flexibly to a second jointed group 74. The jointed groups 70 and 74 include a particular type of rigid connector 40 that will be shown in greater detail later.

The illustrated arrangement also depicts several of the many variations possible for the flexible connectors 50. For example, the flexible connector 50 interconnecting segment 22-3 from the jointed group 70 to segment 22-4 of the flex group 72 comprises a flexible cable 52 with first and second end connectors 54 and 56 at opposing ends of the cable 52. In this particular configuration of flexible connector 50, one connecting end 54 is configured to mate with segment 22-3 in the same manner as a rigid connector 40 of a similar configuration would mate with that segment. The opposing end 56 is configured differently, and includes a detachable connector operative to removably plug into one end of segment 22-4. Additional variations on the flexible connector 50 are seen in the interconnection between segments 22-4 and 22-5. In that connection, the flexible connector 50 again includes the flexible cable 52 with end connectors 54 and 56, but in this configuration end connector 56 comprises an integral connector that is preferably terminated inside of the segment 22-4. In general, the flexible connectors 50 include a flexible cable or wire 52 operative to couple one or more light curtain signals between interconnected segments, and further include end connectors 54 and 56, which may be detachable end connectors or integral end connectors, or any combination thereof. The particular type of flexible connector 50 used between any two segments 22 or 24 within a series of segments will depend on the configuration of the two segments being interconnected.

The plan view depiction of series-connected transmitter segments 22 in FIG. 2 is simplified for clarity of presentation. However, it should be understood that any group of segments or any one segment within the assembly of transmitter segments 22 may be arranged in essentially any orientation relative to one or more remaining segments in the assembly, thus allowing the system 20 to conform to potentially complex detection plane configurations.

Figure 3:
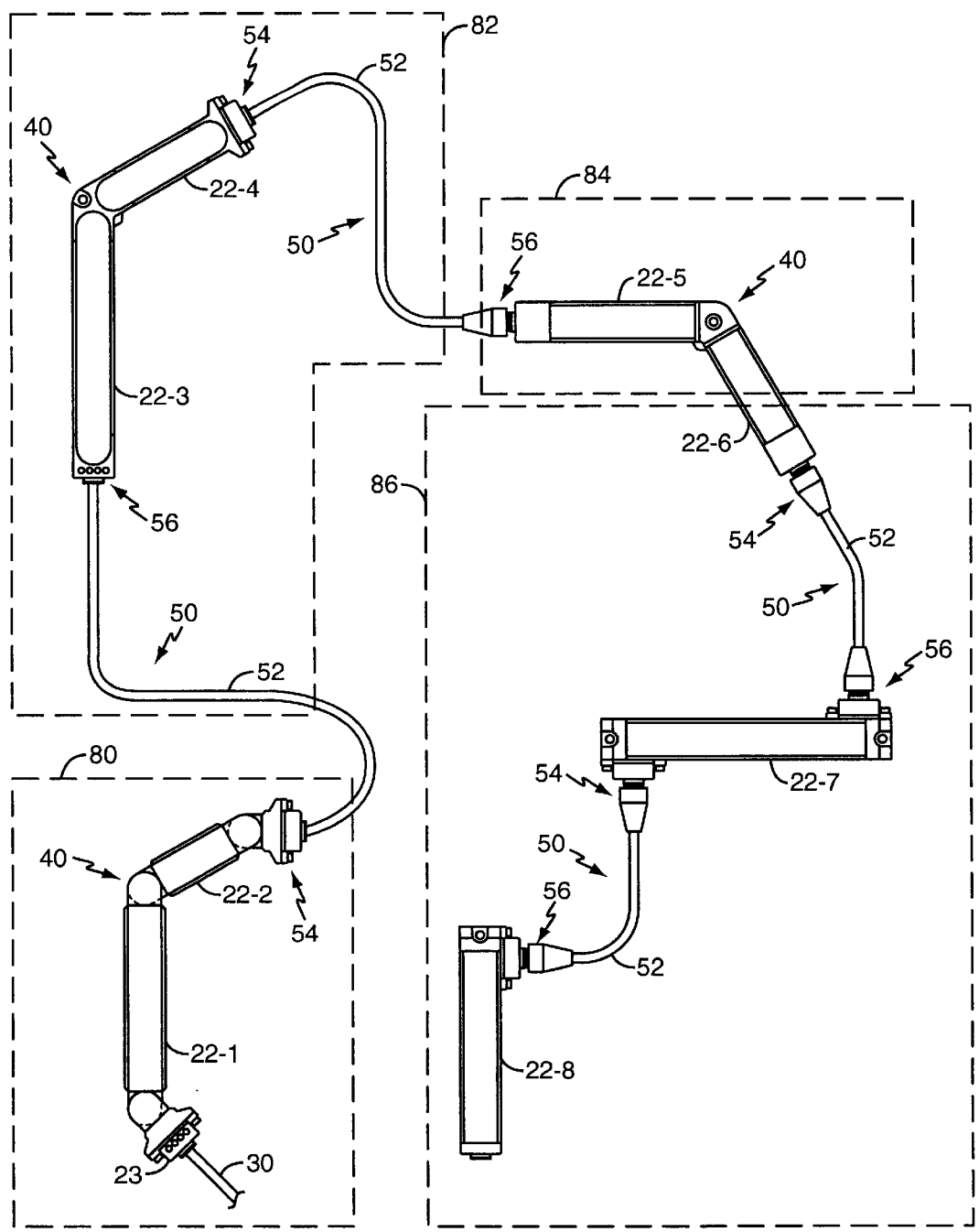
FIG. 3 is a diagram of another embodiment of the mixed architecture light curtain.

FIG. 3 illustrates another exemplary implementation of the light curtain 20. Again, an assembly of transmitter segments 22 is illustrated, but it should be understood that the light curtain 20 preferably further includes a like configured assembly of corresponding receiver segments 24. In the illustration, a rigidly connected articulated group 80 flexibly interconnects to a second rigidly connected articulated group 82, which in turn flexibly connects to a rigidly connected angle group 84, and the angled group 84 in turn flexibly connects with a flexibly interconnected group 86.

Articulated groups 80 and 82 illustrate several variations for rigid connectors 40 and flexible connectors 50. The rigid connectors 40 in the articulated groups 80 and 82 allow inter-segment angle adjustment. That is, the rigid connectors 40 in at least the first articulated group 80 allow rotation between interconnected segments 22. The end cap 23 interfacing the first segment 22-1 to the interface unit 34 (not shown) through cable 30 is also articulated and in this configuration includes status or system operation indicator lights.

Similarly, the flexible connector 50 interconnecting segment 22-2 to segment 22-3 includes a flexible cable 52 with a detachable end connector 54 adapted for articulated interconnection with segment 22-2. The other end of flexible interconnector 50 includes an integral end connection 56 as shown earlier. An additional variation on flexible connector 50 is shown in the interconnection between segments 22-4 and 22-5. Here the flexible cable 52 includes an end connection 54 adapted to mount to segment 22-4 in an end-cap configuration.

Other variations for flexible connector 50 are shown interconnecting segments 22-6 and 22-7, wherein the flexible connector 50 includes the cable 52 and two detachable end connectors for detachably connecting two segments 22-6 and 22-7. Again, the particular configuration adopted for the end connectors 54 and 56 depend on the configuration of the segments 22 or 24 being interconnected.

Figure 4:
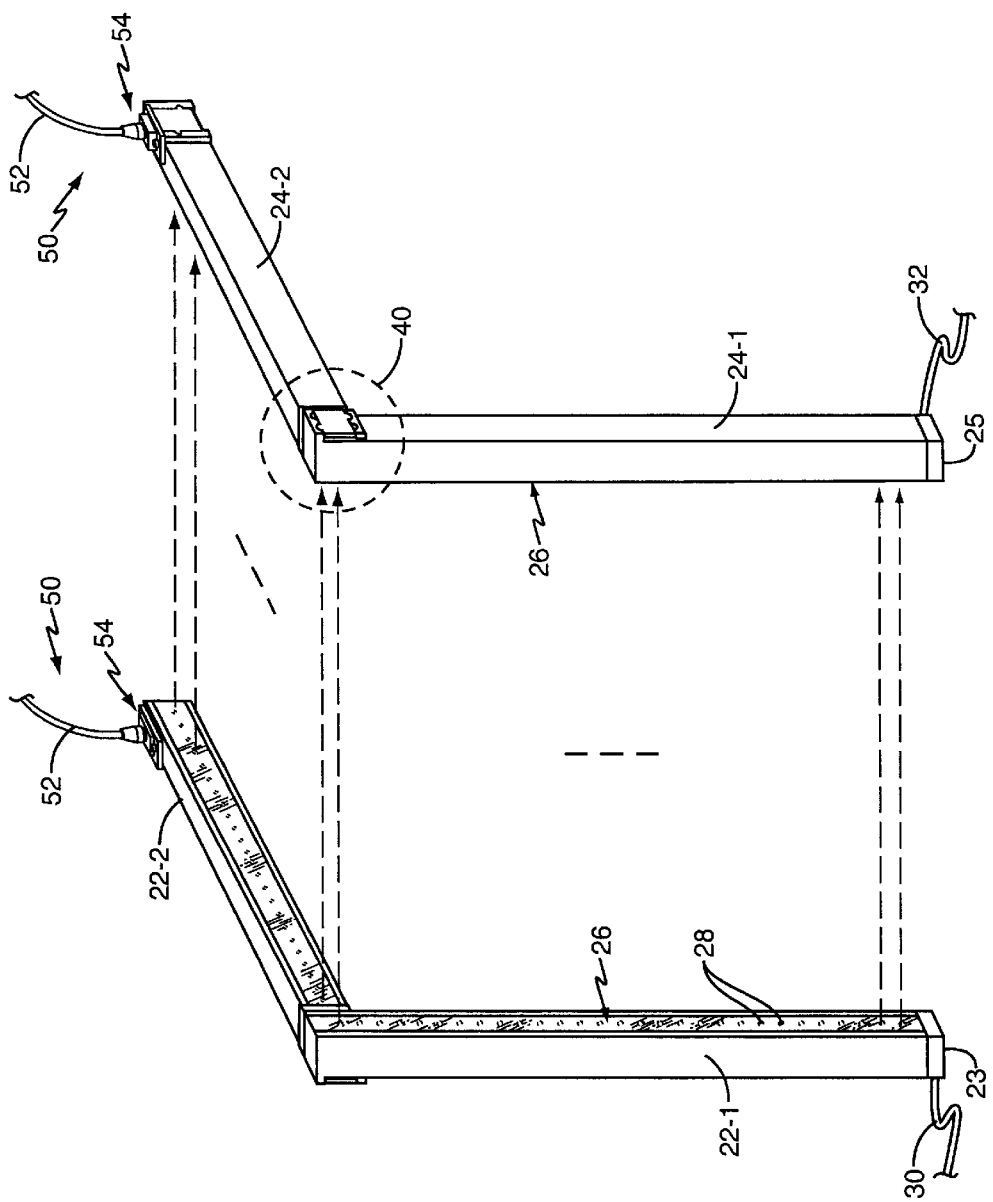
FIG. 4 is a diagram of one embodiment of rigid connectors for use in mixed architecture light curtains.

FIG. 4 illustrates a pair of transmitter segments 22-1 and 22-2 aligned with a pair of receiver segments 24-1 and 24-2, and provides a clearer illustration of one type of rigid connector 40. The diagram also more clearly illustrates an exemplary face 26 of segments 22 and 24.

Typically the face 26 of each segment 22 or 24 includes one or more light units 28. In transmitter segments 22, the light units 28 typically comprise light emitting diodes, or other light emitting sources. Correspondingly, light units 28 in receiver segments 24 comprise one or more light receiving units, such as photosensitive transistors or diodes. Typically, the face 26 of a segment 22 or 24 includes a linear array of spaced apart light units 28. The spacing of the light units 28 is often referred to as beam pitch, or simply as pitch. The pitch of light units 28 arrayed along the face 26 determines, along with other optical characteristics, the resolution or minimum object detection capability of the given segment 22 or 24. It may be desirable to preserve the pitch between interconnected segments 22 or 24, and certain implementations of the rigid connectors 40 permit such beam pitch preservation across segment interconnections.

FIG. 4 also shows, as noted, greater detail for one variation on the end connector 54 of flexible connectors 50. In this variation, the end connector 54 accommodates the interconnection configuration of the rigid connectors 40. In this manner, a segment 22 or 24 that is otherwise configured for rigid interconnection may be flexibly connected with additional segments through an appropriately configured flexible connector 50.

Figure 5B:
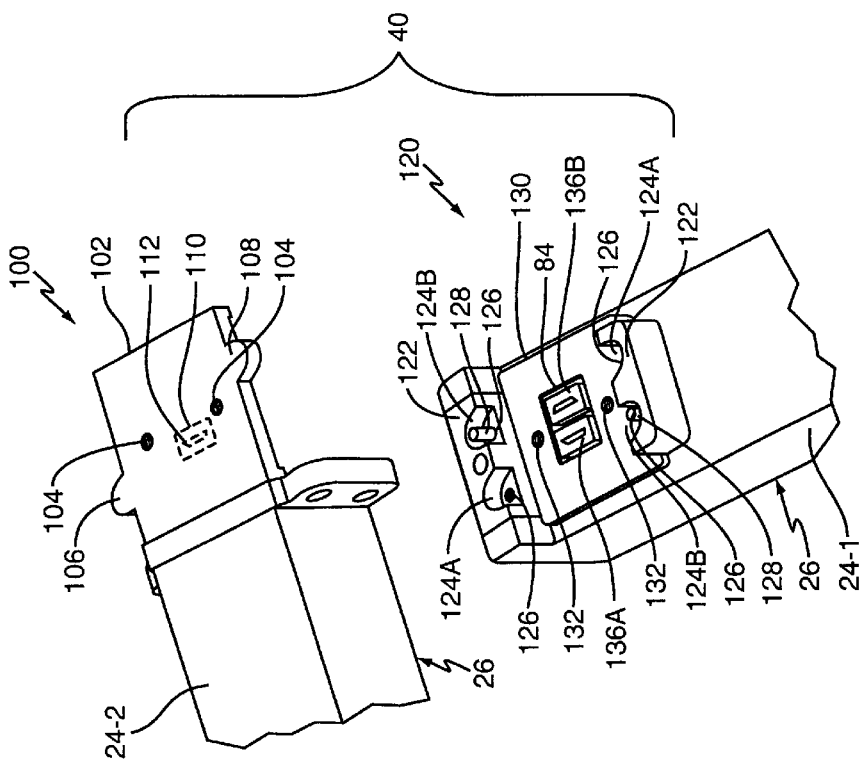
FIGS. 5A and 5B are diagrams showing exemplary details of the rigid connector of FIG. 4.
Figure 5A:
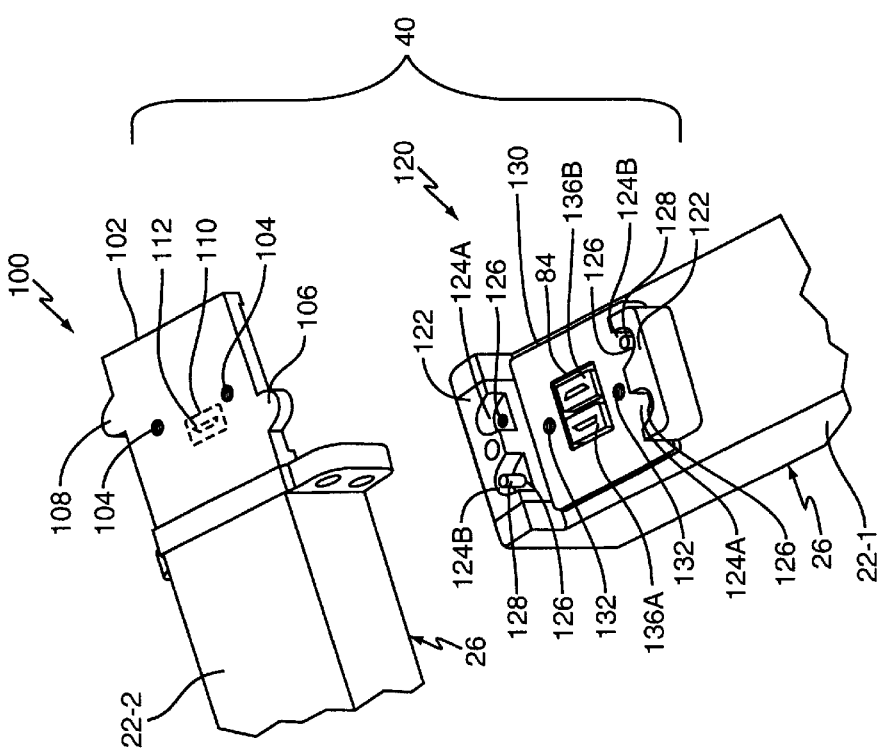

FIGS. 5A and 5B show exemplary details for the type of rigid connector 40 depicted in FIG. 4. The rigid connector 40 may be keyed or otherwise configured for interconnecting transmitter segments 22 or receiver segments 24. By keying the rigid connector 40 for a specific type of segment (e.g., receiver or transmitter), the inadvertent misconnection of a receiver segment 24 with a transmitter segment 22 via the rigid connector 40 is prevented.

This type of rigid connector 40 comprises a coupler assembly 100 and a mating receptacle 120. The coupler assembly 100 comprises a coupler 102, mounting holes 104, keying tabs 106 and 108, a connector opening 110, and a signal connector 112.

Mating receptacle 120 is adapted to receive the coupler assembly 100 and to permit secure fastening of the coupler assembly 100 to the mating receptacle 120. The mating receptacle 120 comprises opposing keying blocks 122, tab seats 124, keying holes 126, and keying pins 128, a seating face 130, mounting holes 132, a connector opening 134, and signal connectors 136A and 136B.

The operation and mating details of this type of rigid connector 40 are explained in great detail in the earlier incorporated application entitled "Segmented Light Curtain with Keyed Interfaces." As explained in that application, the illustration of FIG. 5B shows the same type of rigid connector 40 but configured or keyed for use with receiver segments 24.

Figure 6:
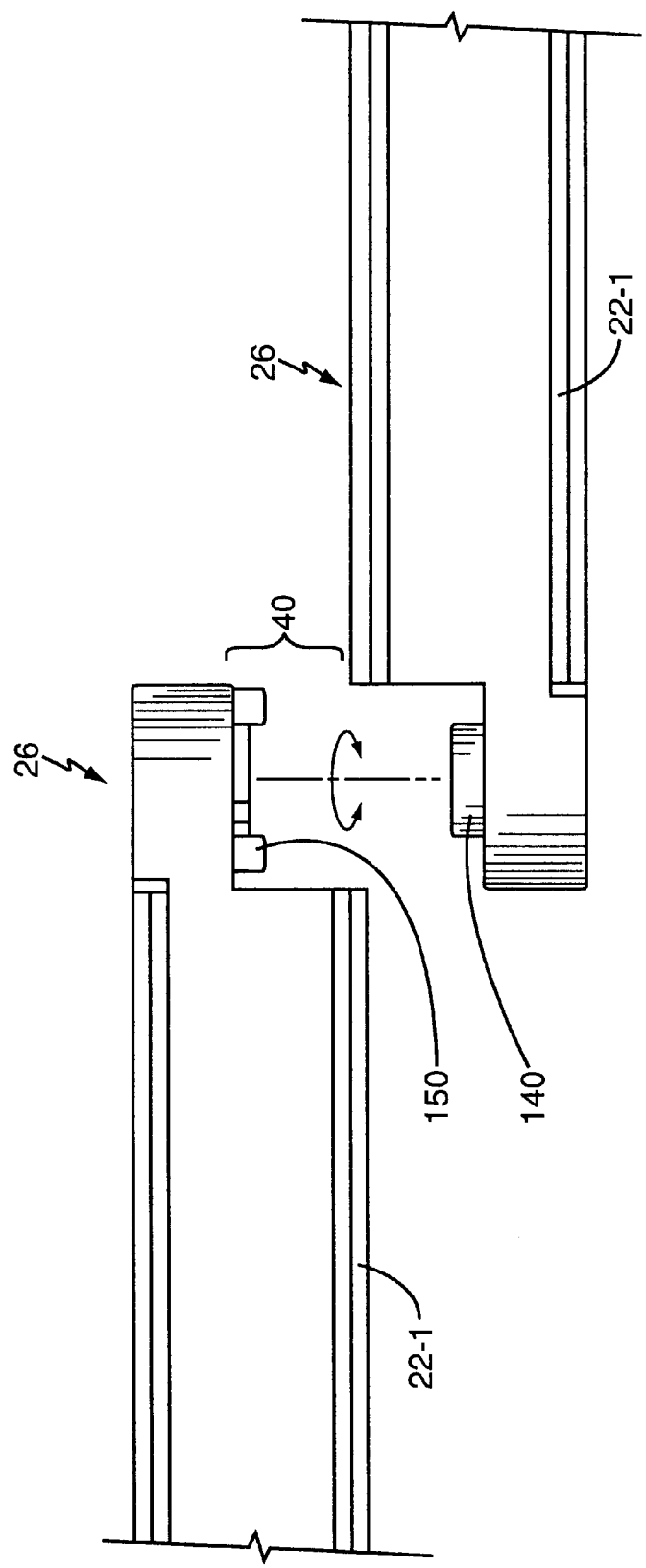
FIG. 6 is a diagram of another embodiment of rigid connectors for use in mixed architecture light curtains.

FIG. 6 depicts another type of rigid connector 40. Again, transmitter segments 22 are illustrated but the details may be equally applied to receiver segments 24. Here, the structure of segments 22 is somewhat different than that of the segments 22 depicted, for example, in FIG. 4. In this embodiment, the segments 22 (or 24) have rounded distal ends, with offsets at these ends that form shelves on which mating connector halves 140 and 150 are attached. Mating connector halves or sections 140 and 150 comprise an exemplary type of rigid connector 40, and allow two rigidly interconnected segments 22 or 24 to be rotatably interconnected.

Figure 7A:
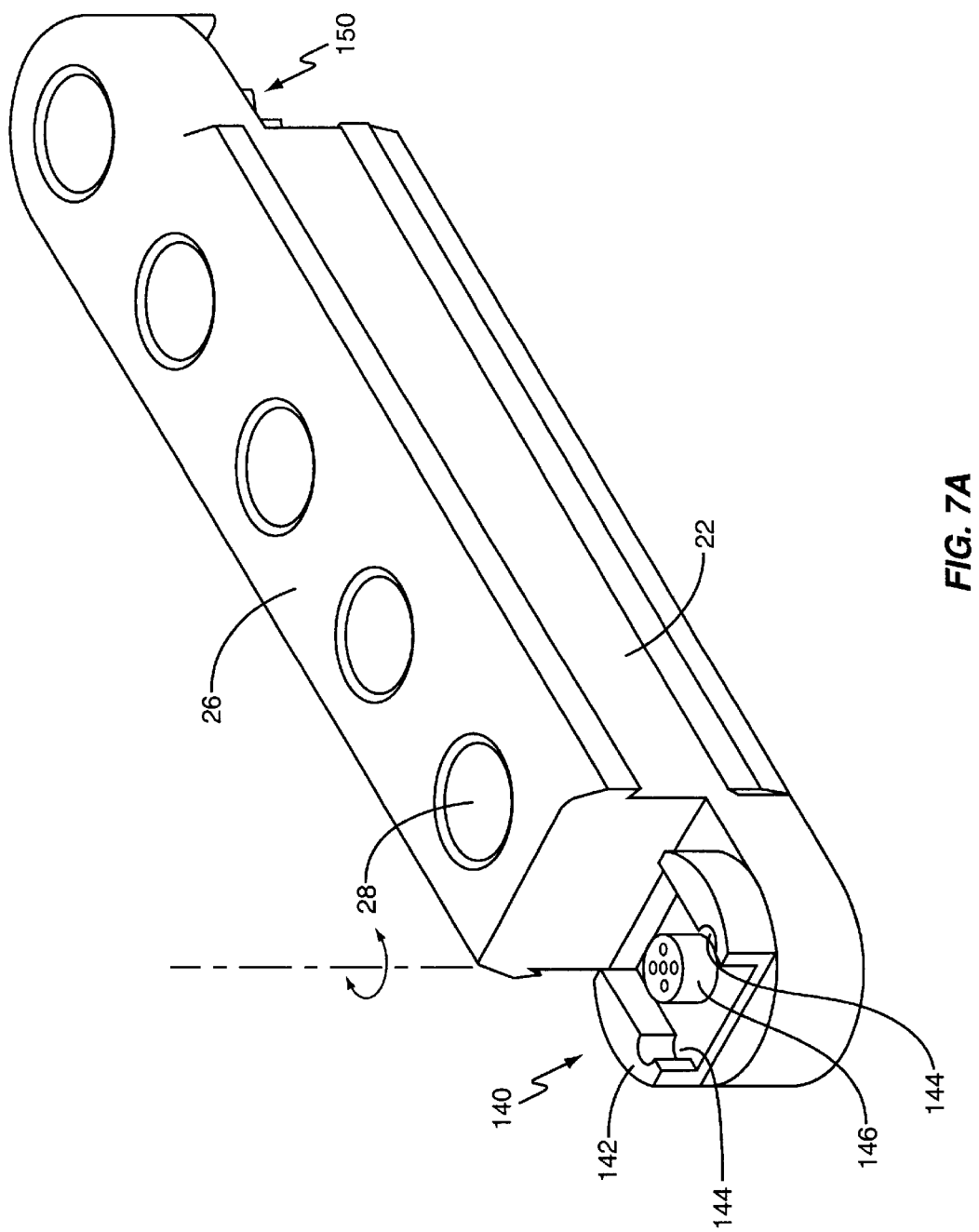
FIGS. 7A and 7B are diagrams showing exemplary details of the rigid connector of FIG. 6.

FIG. 7A depicts an exemplary configuration for the segments 22 or 24 utilizing this type of rigid connector 40. Mating section 140 is more clearly depicted in this diagram, and in this exemplary embodiment comprises a mating block 142, mating features 144, and a signal connector 146. The opposite end of the depicted segment 22 includes mating section 150. As noted, the segment 22 (or 24) is formed in this embodiment with rounded distal ends to facilitate rotation between interconnected segments 22. Inter-segment angle adjustment through segment rotation is achieved by configuring mating sections 140 and 150 to be rotatably fastened to or mounted on the respective segments 22 or 24.

Figure 7B:
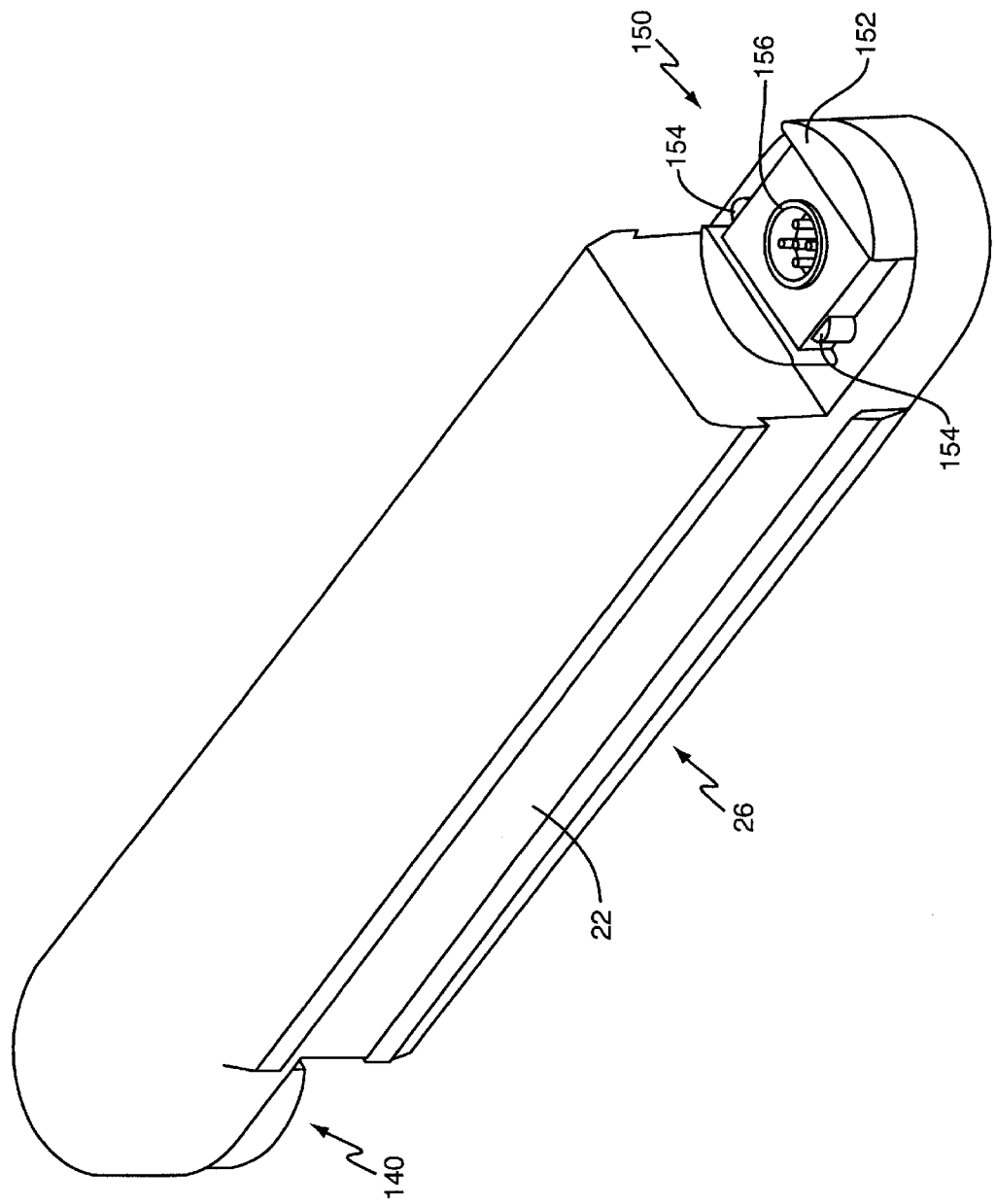

FIG. 7B depicts the segment 22 of FIG. 7A flipped over and turned to more clearly show the details of mating section 150. Mating section 150 comprises a mating block 152, mating features 154, and a signal connector 156. As with the version with the rigid connector 40 depicted in FIGS. 5A and 5B, rigid connectors 40 based on mating sections 140 and 150 may be keyed for transmitter and receiver use, thereby preventing the inadvertent misconnection of receiver segments 24 with transmitter segments 22. The details of this configuration are explained fully in the incorporated parent application entitled "Segmented Light Curtain with Keyed Interfaces."

FIG. 8 depicts exemplary alternate embodiments for the segments 22 (or 24), and shows various exemplary implementations for different types of rigid connectors 40 and further shows a variation on flexible connector 50. The details on this modular approach are more fully explained application Ser. No. 09/523,406 and 09/626,098.

The modular approach may be used to implement, for example, the angled group 84 depicted in FIG. 3. A modular end cap 23 comprising upper and lower blocks is configured to provide termination for segment 22-1, which is in turn joined to segment 22-2 through rigid connector 40-1. In this embodiment, rigid connector 40-1 comprises a modular angle block that includes a lower section 170 that includes inter-segment signal connectors 172 and 174. The lower block 170 and corresponding upper blocks 180 and 182 fasten together over adjacent ends of segments 22-1 and 22-2 using mounting screws 184.

Rigid connector 40-2 depicts a corner block connector comprising a lower block 190 that includes inter-segment signal connectors 192 and 194. The lower block 190 and upper block 196 combine to secure adjacent ends of segments 22-2 and 22-3 and are fastened together via fastening screws 198.

An exemplary modular approach to flexible connector 50 is shown interconnecting with segment 22-3. In this exemplary embodiment, the flexible connector 50 includes the flexible cable 52 with a modular end connector 54 (or 56) comprising a lower block 200 and an upper block 202 that combine together to fasten end coupler 204 to segment 22-3. The end connector assembly 54 is secured using fastening screws 206.

While FIG. 8 illustrates exemplary end connectors 54 (or 56) adapted for use with modular-configured segments 22 or 24, FIGS. 9A–9D illustrate exemplary embodiments for flexible end connectors 54 adapted for use with the type of rigid connector 40 depicted in FIGS. 4 and 5. FIG. 9A depicts an embodiment of the end connector 54 that comprises an end coupler assembly adapted to mate with the receptacle 120 depicted in FIGS. 5A and 5B. Note that end connector 54 includes one or more status indicators that may be used to provide operating status to personnel nearby the light curtain 20. With the inclusion of status indictors (e.g., LEDs), the end connector 54 is typically used to make the first connection between the interface unit 34 and the series-connected assembly of light curtain segments 22 or 24. Thus, end connector 54 may function as an end cap for the segment 22 or 24 to which it attaches. Typically, only one end connector 54 (or similarly configured end cap 23 or 25) includes indicators, within a given set of transmitter or receiver segments 22 or 24.

FIG. 9B illustrates the same configuration for end connector 54 but deletes the status indicators. FIGS. 9C and 9D show versions of the end connector 54 where the cable 52 is integrally connected to the end coupler 54, with and without status indicators, respectively.

FIGS. 10A–10D show similar variations on the end connectors 54 but adapted for use with the articulated versions of the segments 22 or 24 as shown in FIGS. 6 and 7A–B. Thus, the end connectors 54 in these diagrams preferably include one of the mating sections 140 or 150 illustrated, for example, in FIG. 6. As with the variations shown in FIG. 9, these various embodiments of end connectors 54 may be keyed for use with either transmitter or receiver segments, thereby preventing inadvertent interconnection of transmitter and receiver segments via flexible connectors 50. It should be understood that the details regarding end connector 54 may equally apply to end connector 56, and that a flexible connector 50 may have essentially any combination of configurations for its end connectors 54 and 56.

In embodiments of the flexible connector 50 where the cable 52 is detachable from one or both end connectors 54 and 56, the detachable portion of the cable itself may include keying features that would prevent interconnection of a detachable cable 52 with the wrong type of end connector 54 or 56. That is, if the cable 52 is detachable from one or both end connectors 54 and 56, the detachable portion of the cable 52 may be keyed differently between transmitter segments 22 and receiver segments 24.

Those skilled in the art will recognize the many approaches to detachable connector keying. For example, assuming that the detachable interconnection between the cable 52 and one or both end connectors 54 and 56 is implemented using conventional circular connectors, keying may be accomplished by using dissimilar circular connector keying between transmitter and receiver segments. Conxal, a manufacturer having a business address of 601 East Wildwood, Villa Park, Ill. 60181, manufactures exemplary keyed circular connectors as might be used to provide detachable interconnection between the cable 52 and end connectors 54 and 56. Keying in accordance with these exemplary circular connectors may involve defining different interconnection arrangements for connector pins, or may involve defining differently shaped or oriented keying features within the connectors.

While the above illustrations show various configurations that may be used to implement the curtain 20, it should be understood that these variations are not exhaustive. Indeed, substantial variations on the types of rigid connectors 40 and flexible connectors 50 are possible. These variations may influence the design or structure of the segments 22 or 24, but as shown above, various types of segments 22 and 24 may be used within the curtain 20. Other variations may include the use of curved segments, which provide curved detection planes and may have advantages in some installations. Of course, curved segments 22 (or 24) may be mixed with straight segments 22 (or 24) as desired.

As apparent from the many exemplary variations detailed in the above discussion, the present invention is subject to substantial variation. Thus, the foregoing examples should not be construed as limiting the scope of the present invention. Indeed, the present invention is limited only the scope of the following claims and the reasonable equivalents thereof.

What is claimed is:

1. A light curtain system comprising a plurality of transmitter segments and a plurality of receiver segments, the receiver segments operative to receive one or more light beams from corresponding ones of the transmitter segments; and wherein each plurality of segments comprises at least a first segment coupled to a second segment by a rigid connector, said rigid connector being one of a fixed-angle rigid connector or a rotatable-angle rigid connector, and a third segment coupled to one of the first and second segments by a flexible connector, said flexible connector being a flexible cable connector, such that each plurality of segments comprises a mix of rigidly and flexibly interconnected segments; and wherein the rigid connectors used in each plurality of light curtain segments are keyed for either transmitter use or receiver use to prevent misconnecting a transmitter segment to a receiver segment through a rigid connector.

2. The light curtain system of claim 1 wherein each plurality of light curtain segments comprise first and second segments rigidly coupled together as a first pair of segments by a rigid connector, and a third segment coupled to the first pair of segments by a flexible connector.

3. The light curtain system of claim 1 wherein each plurality of light curtain segments further comprises a fourth segment coupled to one of the first and second segments by a second flexible connector.

4. The light curtain system of claim 1 wherein each plurality of light curtain segments further comprises a fourth segment coupled to the third segment by a second flexible connector.

5. The light curtain system of claim 1 wherein each plurality of light curtain segments further comprises a fourth segment coupled to the third segment by a second rigid connector, such that the first and second segments form a first rigidly coupled pair of segments and the third and fourth segments form a second pair of rigidly coupled segments, such that the first and second pairs of rigidly coupled segments are coupled together by a flexible connector.

6. The light curtain system of claim 1 wherein each of the pluralities of light curtain segments comprises a first set of rigidly connected segments coupled together using a first type of rigid connector.

7. The light curtain system of claim 6 wherein each of the pluralities of light curtain segments comprises a second set of rigidly connected segments coupled together using a second type of rigid connector, and wherein the first set of rigidly connected segments is coupled to the second set of rigidly connected segments through a flexible connector.

8. The light curtain system of claim 1 wherein the rigid connecters used in each of the pluralities of light curtain segments are jointed fixed connectors for coupling two segments together at a right angle.

9. The light curtain system of claim 1 wherein the rigid connecters used in each of the pluralities of light curtain segments are fixed-angle rigid connectors for coupling two segments together at a defined inter-segment angle.

10. The light curtain system of claim 1 wherein the flexible connectors used in each plurality of light curtain segments are keyed for either transmitter use or receiver use to prevent misconnecting a transmitted segment to a receiver segment through a flexible connector.

11. The light curtain system of claim 1 wherein a portion of the flexible connectors used in each of the pluralities of light curtain segments comprises a first type of flexible connector.

12. The light curtain system of claim 11 wherein a remaining portion of the flexible connectors used in each of the pluralities of light curtain segments comprises at least a second type of flexible connector.

13. The light curtain system of claim 1 wherein each of the pluralities of light curtain segments comprises a first segment, one or more intervening segments, and a last segment; and wherein intervening segments are series coupled between the first and last segments in a desired configuration of rigid and flexible segment connections.

14. The light curtain system of claim 1 wherein each of the pluralities of light curtain segments comprises two or more rigidly connected light curtain segments coupled together via rigid connectors, and wherein the rigid connectors preserve the beam pitch across rigidly coupled segments.

15. The light curtain system of claim 1 wherein each of the pluralities of light curtain segments comprises segments of differing segment beam pitches.

16. The light curtain system of claim 1 wherein each of the pluralities of light curtain segments comprises segments of the same segment beam pitch.

17. A light curtain comprising a plurality of light curtain segments connected together in series, wherein each one of the segments comprises at least one light unit, such that the series-connected segments collectively form a combined set of light units; and wherein at least one segment in the plurality of segments connects to another segment in the plurality of segments through rigid connector, said rigid connector being one of a fixed-angle rigid connector or a rotatable-angle rigid connector, and wherein at least one segment in the plurality of segments connects to another segment in the plurality of segments through a flexible connector, said flexible connector being a flexible cable connector, such that the light curtain comprises both rigidly and flexibly connected segments; wherein the rigid connector comprises a coupler assembly affixed to a first end of a first segment and a receptacle affixed to a first end of a second segment, and wherein the receptacle is operative to mate with the coupler assembly, thereby rigidly coupling the first and second segments together; and wherein the coupler assembly and the receptacle comprise a keyed connector having a first configuration when used to connect transmitter type light curtain segments, and a second configuration when used to connect receiver type light curtain segments.

18. The light curtain of claim 17 wherein the rigid connectors and flexible connectors used in connecting various segments within the plurality of light curtain segments each comprise signal connectors operative to couple one or more light curtain signals between light curtain segments.

19. The light curtain of claim 17 wherein the rigid connector comprises an angled connector operative to receive a first end of a first segment and a first end of a second segment, thereby joining the first and second segments together.

20. The light curtain system of claim 17 wherein the rigid connector is configured to preserve uniform light unit spacing between first and second segments connected together by the rigid connector.

21. The light curtain system of claim 17 wherein the rigid connector comprises one or more light units configured to continue light unit spacing between first and second segments connected together by the rigid connector.

22. The light curtain system of claim 17 wherein the flexible cable connector comprises a cable having first and second ends with a length therebetween, said cable running between a first segment and a second segment, and passing one or more light curtain signals between the first and second segments.

23. The light curtain system of claim 22 wherein the cable comprises an integral connection on at least a first end of the cable such that the cable integrally connects to one of the first or second segments.

24. The light curtain system of claim 22 wherein the cable comprises a detachable connection on at least a first end of the cable such that the cable detachably connects to one of the first or second segments.

25. The light curtain system of claim 24 wherein the detachable connection comprises a keyed connector having a first configuration when used to interconnect transmitter type light curtain segments, and a second configuration when used to interconnect receiver type light curtain segments.

26. The light curtain system of claim 17 wherein the plurality of light curtain segments comprises one or more groups of rigidly connected light curtain segments, and a least one additional light curtain segment coupled to one of the groups of rigidly connected segments by a flexible connector.

27. The light curtain system of claim 17 wherein the plurality of light curtain segments comprises at least two groups of rigidly connected light curtain segments, wherein segments within a group interconnect through rigid connectors, and wherein each group in the at least two groups connects to another group through a flexible connection.

28. The light curtain system of claim 27 wherein the at least two groups of rigidly connected light curtain segments a first group of segments rigidly interconnected using a first type of rigid connector, and a second group of segments rigidly interconnected using a second type of rigid connector.

29. The light curtain system of claim 28 wherein the first type and the second type of rigid connectors are different ones selected from the group of jointed, modular angled, and modular articulated rigid connectors.

30. A method of interconnecting a first plurality of light curtain segments, the method comprising:

interconnecting two or more light curtain segments in series using at least one rigid connector to form a rigidly connected set of segments, said rigid connector being one of a fixed-angle rigid connector or a rotatable-angle rigid connector;

interconnecting at least on additional segment in series with the rigidly connected set of segments using a flexible connector, said flexible connector being a flexible cable connector; and keying the rigid and flexible connectors differently between transmitter type light curtain segments and receiver type light curtain segments to prevent interconnection of transmitter type segments with receiver type segments;

wherein the first plurality of light curtain segments is operative to function as a combined set of segments.

31. The method of claim 30 further comprising interconnecting a second plurality of light curtain segments in like manner as the first plurality, and wherein the first plurality of segments comprises a light transmitter assembly and the second plurality comprises a light receiver assembly.

32. The method of claim 30 further comprising forming a number of flexibly interconnected groups of rigidly connected segments from said first plurality of segments.

33. The method of claim 32 further comprising configuring at least two of the flexibly interconnected groups of rigidly connected segments to use different types of rigid connectors.

34. The method of claim 32 further comprising configuring the flexible connector to have at least one end that integrally connects to one of the segments in the first plurality of segments.

35. The method of claim 30 further comprising configuring the flexible connector to have at least one end that detachably connects to one of the segments in the first plurality of segments.

36. The method of claim 30 further comprising interconnecting one or more light curtain signals between joined segments within the first plurality of segments via the rigid and flexible connectors.

37. The method of claim 30 further comprising configuring the first plurality of segments to use two or more different types of the flexible segments.

38. The method of claim 31, further comprising keying the rigid and flexible connectors differently between transmitter type light curtain segments and receiver type light curtain segments to prevent interconnection of transmitter type segments with receiver type segments.

39. A light curtain system comprising a plurality of transmitter segments and a plurality of receiver segments, the receiver segments operative to receive one or more light beams from corresponding ones of the transmitter segments; and wherein each plurality of segments comprises at least a first segment coupled to a second segment by a rigid connector, said rigid connector being one of a fixed-angle rigid connector or a rotatable-angle rigid connector, and a third segment coupled to one of the first and second segments by a flexible connector, said flexible connector being a flexible cable connector, such that each plurality of segments comprises a mix of rigidly and flexibly interconnected segments; and wherein the flexible connectors used in each plurality of light curtain segments are keyed for either transmitter use or receiver use to prevent misconnecting a transmitter segment to a receiver segment through a flexible connector.

40. A light curtain comprising a plurality of light curtain segments connected together in series, wherein each one of the segments comprises at least one light unit, such that the series-connected segments collectively form a combined set of light units; and wherein at least one segment in the plurality of segments connects to another segment in the plurality of segments through a rigid connector, said rigid connector being one of a fixed-angle rigid connector or a rotatable-angle rigid connector, and wherein at least one segment in the plurality of segments connects to another segment in the plurality of segments through a flexible connector, said flexible connector being a flexible cable connector, such that the light curtain comprises both rigidly and flexibly connected segments; wherein the rigid connector comprises a first mating section affixed to a first end of a first segment and a matching second mating section affixed to a first end of a second segment, and wherein the first and second mating sections are operative to mate together, thereby rigidly coupling the first and second segments together; and wherein the first and second mating sections comprise keyed mating sections having a first configuration when used to connect transmitter type light curtain segments, and a second configuration when used to connect receiver type light curtain segments.

41. The light curtain system of claim 40 wherein the first and second mating sections comprise rotatable mating sections, thereby allowing articulation of the mated first and second segments to adjust an inter-segment angle formed by the mated first and second sections.

* * * * *